Aug. 24, 1943.                C. B. HOBSON                2,327,893
                                COMBINE
              Filed Sept. 9, 1941            3 Sheets-Sheet 1

INVENTOR
Cecil B. Hobson.
BY
Corbett, Mahoney + Miller

Aug. 24, 1943.                 C. B. HOBSON                    2,327,893
                                 COMBINE
                       Filed Sept. 9, 1941         3 Sheets-Sheet 2

INVENTOR
Cecil B. Hobson.
BY

Aug. 24, 1943. C. B. HOBSON 2,327,893
COMBINE
Filed Sept. 9, 1941 3 Sheets-Sheet 3

INVENTOR
Cecil B. Hobson.
BY

Patented Aug. 24, 1943

2,327,893

UNITED STATES PATENT OFFICE 2,327,893

COMBINE

Cecil B. Hobson, Marion, Ohio

Application September 9, 1941, Serial No. 410,187

10 Claims. (Cl. 146—123)

My invention relates to combines. It has to do, more particularly, with combines which cut and thresh grain as they move over fields in which the grain stands. More specifically, it relates to an attachment for combines of the type now commonly in use which is adapted to cut the straw or vine as it is discharged from the combine and spread it over the field.

At the present time, combines are usually so constructed that the straw or vine is discharged in its original length and in large bunches, formed in windrows behind the machine. It is usually the practice to burn this straw or vine or to spread it by hand over the field in order to utilize the fertilizer value of the straw or vine. Attempts have been made to provide an attachment for a combine which would cut the straw or vine into short lengths and spread the material thinly over the field behind the combine. However, such prior art attachments have not been satisfactory. In the first place, the prior art attachments do not cut the straw and distribute it thoroughly. Furthermore, with prior art attachments, it is necessary to provide some means for positively forcing the straw into the cutter since the cutter is so located that gravity feed cannot be employed. Also, the cutters of these prior art attachments are of such a nature that large bunches of straw will cause jamming of the cutter as they pass into the cutter. Also, these prior art attachments have been of such a nature that they are difficult to attach to the combine or to remove therefrom in order to permit the use of other attachments.

One of the objects of my invention is to provide an attachment for a combine which will thoroughly cut waste straw or vine resulting from the threshing operation and will thoroughly and evenly distribute this material over the field behind the combine so that the fertilizing value of this material can be utilized.

Another object of my invention is to provide an attachment of the type indicated which can be attached to the combine readily or can be removed therefrom readily in order to permit the use of other attachments.

Another object of my invention is to provide an attachment of the type indicated for a combine which is so located relative to the discharge outlet of the combine that the straw or vine will be fed thereto by gravity.

Another object of my invention is to provide an attachment of the type indicated which has cutting mechanism of such a nature that there will be no danger of the cutting mechanism jamming.

Another object of my invention is to provide an attachment of the type indicated for a combine which is very simple in structure and can be manufactured and sold cheaply.

Various other objects will be apparent from the following description.

In its preferred form my invention contemplates the provision of an attachment of the type indicated which is attached to the combine adjacent the point where the waste straw or vine, resulting from the threshing operation, is discharged therefrom. This attachment consists mainly of a hopper which is so located that the straw or vine will be fed thereinto by gravity. This hopper is attached at its inner side to the combine by means which permits ready removal thereof. At its outer and bottom portion, the hopper is provided with a transversely extending cutting member. This cutting member is of novel form and serves to first pull in and then cut up large bunches as they enter the cutting mechanism and then shred and finely cut the strands of material. Then this material is fed by the cutting mechanism from an outlet at the outer side of the hopper and is spread finely over the field.

The preferred embodiment of my invention is illustrated in the accompanying drawings wherein similar characters of reference designate corresponding parts and wherein.

Figure 5:
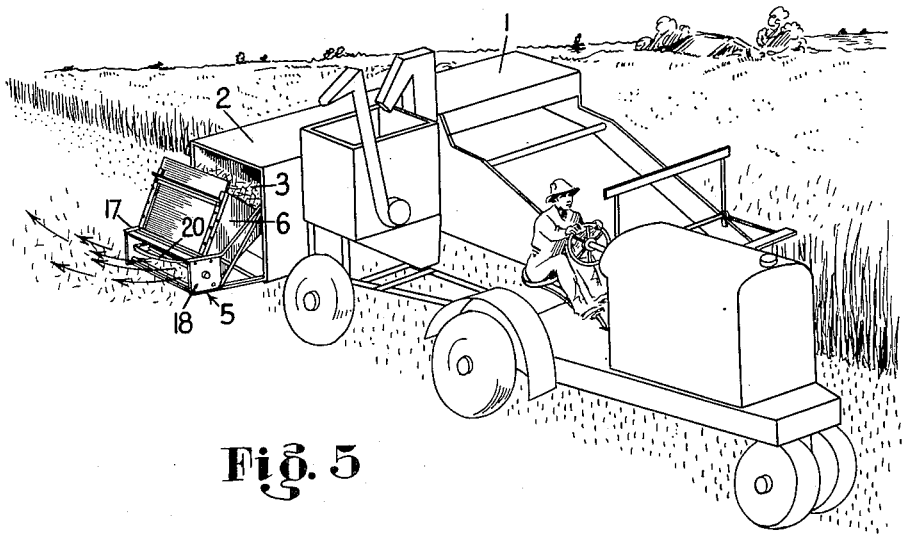
Figure 5 is a perspective view showing the attachment mounted on a combine of a type commonly in use.

With reference to the drawings, in Figure 5 I have illustrated a combine 1 of a type with which my invention may be employed. At the rear and at one side of this combine a laterally extending housing portion 2 is provided having a transversely extending discharge outlet 3 at its upper end, through which straw or vine, resulting from the threshing operation, is discharged. As indicated best in Figure 2, the straw is discharged from the outlet 3 in the usual manner by means of straw racks 4. My attachment, indicated generally by the numeral 5, is attached to the outer side of this housing portion 2 directly below the outlet 3.

My attachment consists mainly of a hopper 6 formed by vertically disposed side walls 7, an inner wall 8 and an outer wall 9. The hopper is preferably formed of metal and the various walls are secured together in a suitable manner, as indicated. The hopper is provided with a number of angle iron braces 10 which are suitably secured together and to the hopper at each side thereof. One end 11 of these braces is disposed at the top of the hopper and is bolted by means of bolt 12 to a vertically disposed angle iron 13 forming a part of housing portion 2. Another end 14 of these braces is disposed at the lower end of the hopper and is secured by a bolt 15 to the angle iron 13. These bolts are provided with long threaded portions passing through suitable openings in member 13, for a purpose to be referred to hereinafter. By means of the bolts 12 and 15, the attachment may be attached to or removed from the combine with ease.

It will be noted that the hopper 6 is below the discharge outlet 3 and, therefore, the material will be fed into the hopper by gravity. It will also be noted, particularly from Figure 2, that the bottom 8 of the hopper is inclined downwardly and outwardly from a point directly below the straw racks 4. Furthermore, an extension 16 is provided on the upper end of the bottom 8 which extends beneath the straw rack to insure that all the straw will fall into the hopper 6. The forward wall 9 of the hopper is also inclined downwardly and rearwardly and is in slightly converging relationship with the bottom wall 8. The outer and lower edges of the walls 8 and 9 are spaced apart to form a lower constricted mouth which communicates with an outwardly extending discharge portion or spout 17 of the hopper. This portion 17 is formed by vertically disposed side plates 18 attached to the braces 10 and held in proper relationship by transversely extending reinforcing rods 19. This portion 18 together with the extreme lower end of hopper 6 serves as a housing for the cutting mechanism indicated generally by the numeral 20.

The cutting mechanism 20 is of novel form. It embodies a rotatable shaft 21 disposed in bearings 22 carried by plates 18. At spaced intervals along the shaft 21, blade-supporting bars 23 are provided. The opposite ends of these bars are adapted to support cutting blades 24. The bars 23 are keyed to shaft 21 and are angularly disposed relative to each other. The blades 24 may be bolted to the ends of the bars. It will be noted that the blades 24 are flat and are disposed in a plane perpendicular to lines extending radially from shaft 21. The bar 23 at one end of the shaft is at right angles to the bar 23 at the other end of the shaft and the blades 24 are curved to the necessary extent from one end to the other about the axis of shaft 21 to permit attachment of the ends to said bars. The blades are curved in this manner so that the cutting action on the straw, as will later more clearly appear, occurs at one point only along the blade at any instant. As shown best in Figure 2, each of the blades 24 comprises a supporting bar 25 carrying a cutting edge 26 which is removably secured thereto by screws 27. The bar 25 is fastened to bars 23 by means of bolts 28.

Figure 1:
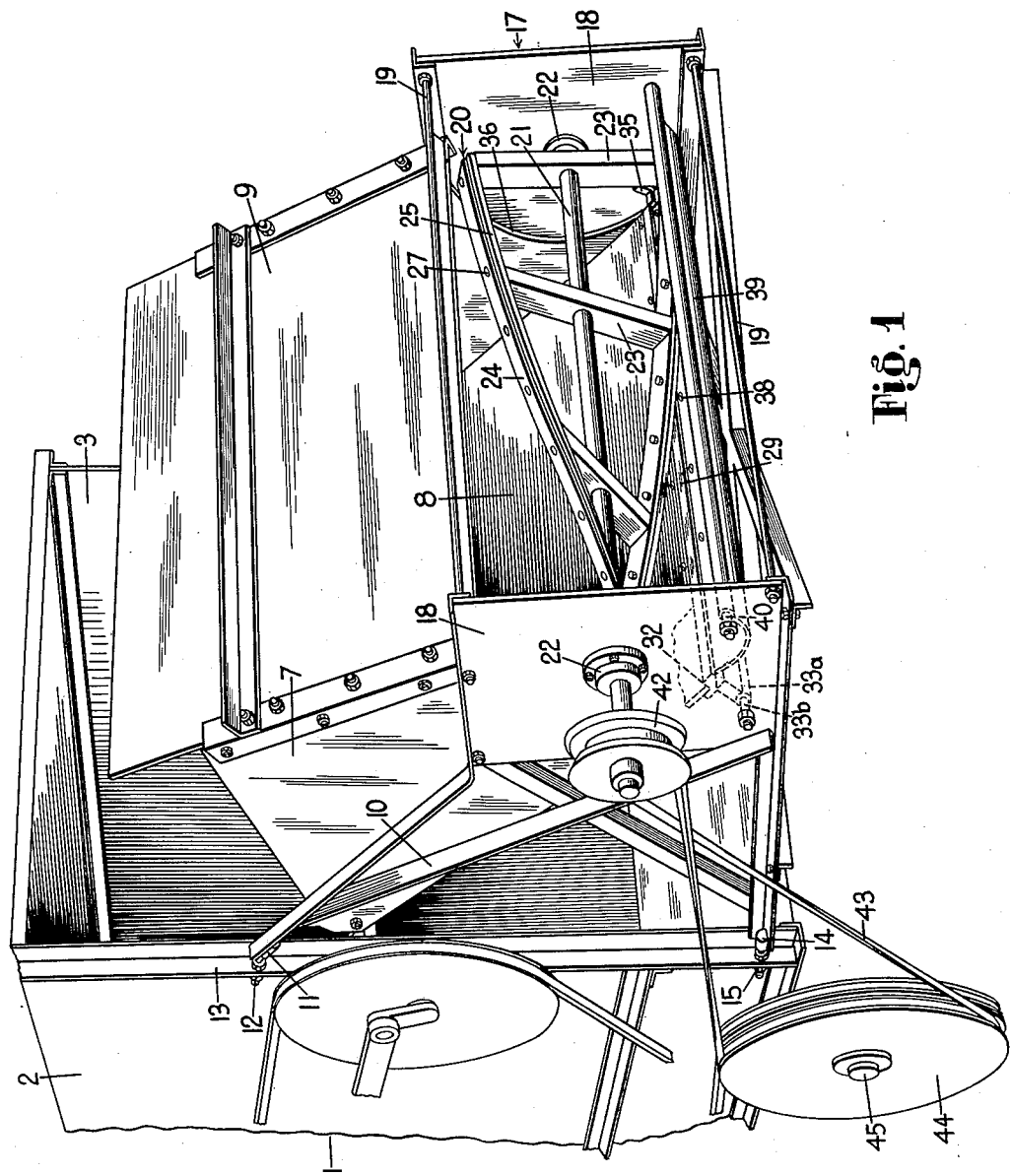
Figure 1 is a perspective view of an attachment made according to my invention and showing it positioned on the combine.
Figure 2:
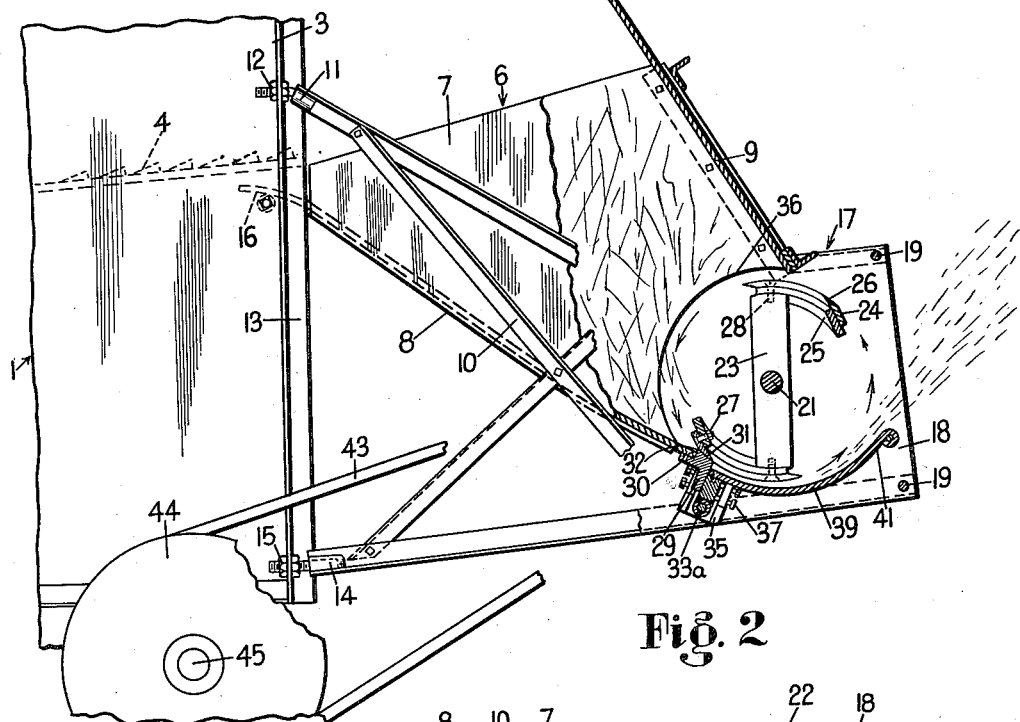
Figure 2 is a view partly in side elevation and partly in vertical section of my attachment.
Figure 3:
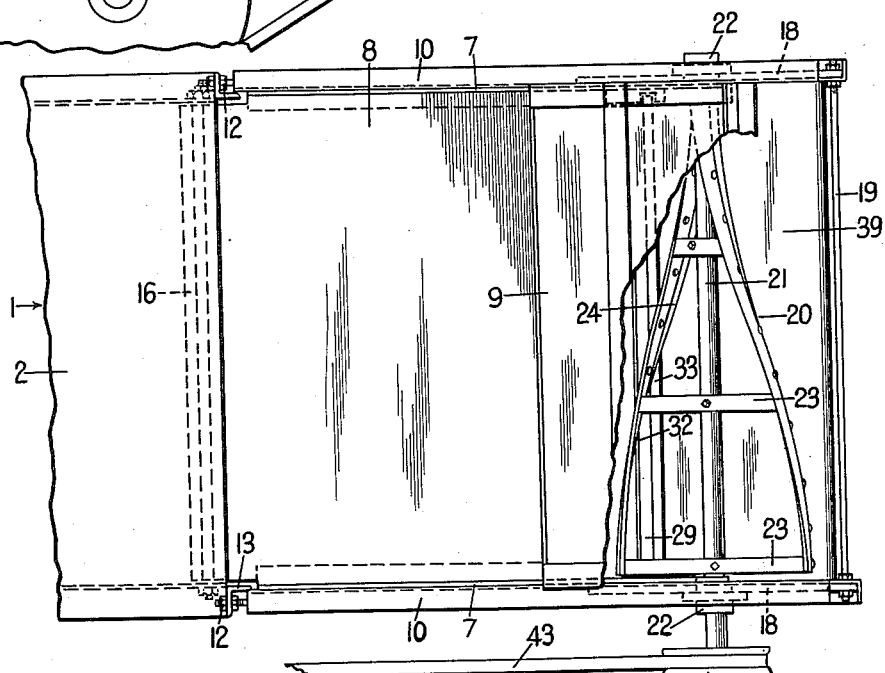
Figure 3 is a plan view of the attachment.
Figure 4:
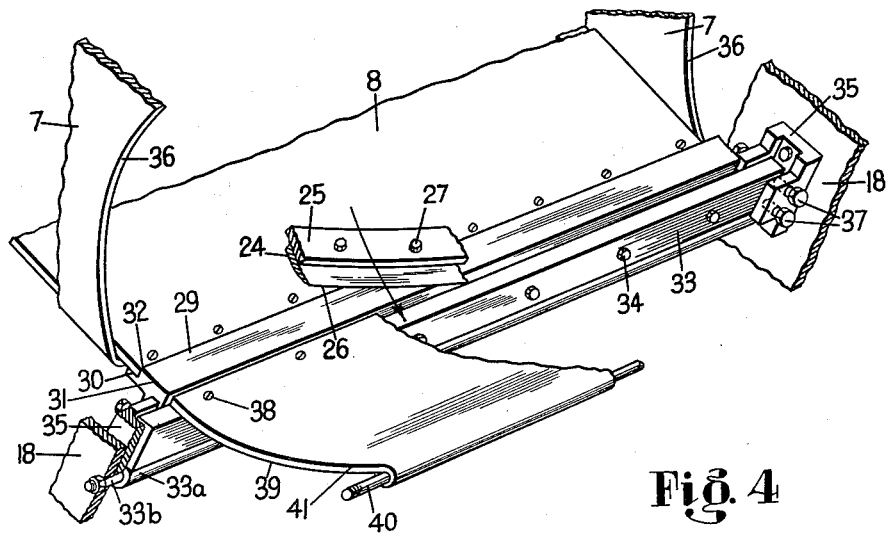
Figure 4 is a detail in perspective showing a portion of the cutting mechanism and the associated portion of the hopper.

As shown best in Figure 2, the cutting member 20 will rotate counterclockwise or toward the bottom wall 8 of the hopper. At the extreme lower edge of the bottom 8, a transversely extending cutting member 29 is provided for cooperating with the blades 24 to produce a shearing action at this point. This cutting member 29 takes the form of a bar which has a flange folded to the lower edge of the bottom plate 8, as at 30. This bar 29 has an upper surface 31 which is slightly curved to permit passage of the cutting edge 26 thereover in close contact therewith. The inner and upper edge 32 of this member 29 projects slightly above the surface of plate 8 and forms a shearing edge with which the cutting edge 26 cooperates. The bar 29 is mainly supported by a bar 33 which is bolted thereto by means of bolts 34. The ends of this bar 33 fit into wide vertical slots formed in brackets 35 which are bolted to the plates 18. It will be noted that the plates 18 overlap the side walls 7 of the hopper and that the lower edges of the walls 7 are curved, as indicated at 36, so as not to interfere with rotation of cutting member 20.

The bar 33 has a sleeve 33a welded to its lower edge and extending the full length thereof. This sleeve receives a hinge rod 33b which has its ends fastened in brackets 35. By adjusting sets of bolts 37, provided in brackets 35 and extending into the slots thereof, the bar 33 may be tilted to different positions about rod 33b, in order to tilt blade 29, the walls 8 and 39 flexing enough to permit this. The upper edge of bar 33 is spaced below the upper surface of the member 29 and has secured thereto by means of screws 38 the inner edge of a curved plate 39. This plate 39 is disposed directly below cutting member 20. The outer edge of this plate 39 is supported by a rod 40 carried by plates 18. This plate 39 is of such a curvature that the blades 24 will be disposed closely adjacent thereto as they are revolved about the axis of shaft 21. The extreme outer portion 41 of this plate is directed upwardly and outwardly so that the straw may be drawn upwardly and outwardly, as indicated in Figure 2.

In the operation of this attachment, the straw will fall by gravity down into the hopper 6. The cutting member 20 will be revolving at a suitable speed. Bunches of the straw may fall between the blades 24 and these bunches will be broken up before the blades carry the straw to the shearing edge 32. At this shearing edge the cutting edge 26 passing in flat contact with the surface 31 will shear the blades of straw at the shearing point 32. This shearing action will occur only at one point, at any instant, along the shearing edge 32 because of the curvature of blades 24. The shredded or sheared straw will be carried by the blades 24 over the curved plate 39 and will be thrown upwardly and outwardly from the plate 39, as indicated best in Figure 2.

The shaft 21 of the cutting member may be driven by means of a pulley 42 keyed on one end thereof. This pulley may be driven by a belt 43 which, in turn, is driven by a pulley 44 of a variable speed type. This pulley is keyed on the outer end of a shaft 45 which is usually provided on a combine for driving attachments adapted to be mounted on the combine. By adjusting bolts 12 and 15 the belt 43 may be tightened or loosened. By changing the speed of rotation of the shaft 21, the size of the particles of straw cut by the member 20 may be changed. Furthermore, by changing the speed of the cutting member, the amount of straw entering into and being discharged from the cutting mechanism will be varied. Because the straw is directed upwardly by the plate 39, it will be spread more effectively since it will merely gradually settle to the earth and will be distributed more effectively as it falls through the air. Without the upwardly curved portion 41 of plate 39, no spreading would result.

It will be apparent from the above description that my attachment has a number of advantages. It will cut the straw into short lengths and spread it uniformly over the field. The straw will be fed from the combine by gravity into the hopper. The cutting mechanism is of such a nature that it not only cuts the straw effectively but also will not become jammed by large bunches of straw. The attachment is of such a nature that it may be readily applied to or removed from a combine. The attachment is of simple structure and can be manufactured at a low cost. The attachment is such that it will spread the straw evenly over the field and will aid in conservation of the land. The straw will prevent erosion of the land, due to heavy rains, etc. It also serves as a fertilizer. Various other advantages will be apparent from the preceding description, the drawings and the following claims.

Having thus described my invention, what I claim is:

1. In combination with a combine having a discharge outlet for straw or similar material, a hopper for receiving the straw having a downwardly extending bottom wall down which the straw will travel by gravity, a cutting mechanism in the bottom of the hopper, a discharge outlet in the hopper adjacent the cutting mechanism and beyond the cutting mechanism, said cutting mechanism embodying a rotatable cutting member formed of a plurality of longitudinally extending circumferentially spaced blades and a stationary blade carried by the bottom wall of the hopper at its lower end behind the rotatable member, said rotatable member rotating toward said bottom wall so that the blades thereof will move into shearing relationship with said stationary blade, and a curved plate forming a continuation of the bottom wall and extending from said stationary blade rearwardly and upwardly through said discharge outlet to a point above the lowermost point of the path of movement of said blades of said rotatable member whereby said plate cooperates with the rotatable member so as to distribute the straw over a wide area.

2. In combination with a combine having a discharge outlet for straw or similar material, a hopper for receiving the straw, a rotatable cutting mechanism at the bottom of the hopper, a discharge outlet in the hopper adjacent the cutting mechanism and beyond the cutting mechanism, said cutting mechanism embodying a plurality of longitudinally extending circumferentially spaced blades and a stationary blade carried by a wall of the hopper, said cutting mechanism including a driving pulley, and a belt drive extending from the combine to said pulley, said hopper being attached to the combine by adjustable bolts to permit tightening of said belt drive.

3. In combination with a combine having a discharge outlet for straw or similar material, a hopper for receiving the straw having a downwardly extending bottom wall down which the straw will travel by gravity, a cutting mechanism in the bottom of the hopper, a discharge outlet in the hopper adjacent the cutting mechanism and beyond the cutting mechanism, said cutting mechanism embodying a rotatable cutting member formed of a plurality of longitudinally extending circumferentially spaced blades and a stationary blade carried by the bottom wall of the hopper at its lower end behind the rotatable member, said rotatable cutting member rotating toward said bottom wall so that the blades thereof will move into shearing relationship with said stationary blade, and a plate forming a continuation of the bottom wall and extending rearwardly from said stationary blade and upwardly through said discharge outlet to a point above the lowermost point of the path of movement of said blades of said rotatable member whereby said plate cooperates with the rotatable member so as to distribute the straw over a wide area.

4. In combination with a combine having a discharge outlet for straw or similar material, a hopper for receiving the straw having a downwardly extending bottom wall down which the straw will travel by gravity, a rotatable cutting mechanism in the bottom of the hopper, a discharge outlet in the hopper adjacent the cutting mechanism and beyond the cutting mechanism, said cutting mechanism rotating toward said bottom wall, and a plate disposed below said cutting mechanism forming a continuation of the bottom wall and extending rearwardly and upwardly through said discharge outlet to a point above the lowermost point of the path of movement of said rotatable cutting mechanism whereby said plate cooperates with the rotatable cutting mechanism so as to distribute the straw over a wide area.

5. In combination with a combine having a discharge outlet for straw or similar material, a hopper for receiving the straw, a rotatable cutting mechanism at the bottom of the hopper, a discharge outlet in the hopper adjacent the cutting mechanism and beyond the cutting mechanism, said cutting mechanism including a driving pulley, and a belt drive extending from the combine to said pulley, and adjustable means for attaching said hopper to the combine for adjustably moving said hopper relative to the combine to permit tightening or loosening of said belt drive.

6. In combination with a combine having a discharge outlet for straw or similar material, a straw-cutting and spreading attachment associated with said combine, said attachment embodying a hopper associated with said discharge outlet for receiving the straw therefrom, rotatable cutting mechanism in the hopper for cutting the straw, said cutting mechanism being disposed at a point below said discharge outlet of the combine so that the straw will be fed thereto by gravity, said hopper having a discharge outlet beyond said cutting mechanism towards which said mechanism rotates and which cooperates with said cutting mechanism so as to distribute the straw over a wide area.

7. In combination with a combine having a discharge outlet for straw or similar material, a straw-cutting and spreading attachment associated with said combine, said attachment embodying a hopper associated with said discharge outlet, said hopper having a downwardly and rearwardly inclined bottom wall down which the straw will travel by gravity, a cutting mechanism disposed within said hopper and adjacent said wall, said cutting mechanism embodying a rotatable cutting member formed of a plurality of longitudinally extending circumferentially spaced cutting blades and a longitudinally extending stationary cutting blade carried by said wall behind the rotatable member, said rotatable member being disposed at a point below said discharge outlet of the combine so that the straw will be fed thereto by gravity and rotating toward said wall so that the blade thereof will move into shearing relationship with said stationary blade, said hopper having a discharge outlet beyond said cutting mechanism towards which said cutting member rotates and which cooperates with cutting mechanism so as to distribute the straw over a wide area.

8. The combination set forth in claim 7 wherein a wall member is disposed below said cutting mechanism at an angle to the inclined hopper wall and which extends toward said discharge outlet.

9. A structure according to claim 7 wherein said longitudinally extending circumferentially spaced cutting blades are carried by a spider-like frame, said frame being carried by a central supporting shaft to permit bunches of straw to pass radially between said blades to a point adjacent said shaft.

10. A structure according to claim 7 wherein said longitudinally extending circumferentially spaced cutting blades are carried by a spider-like frame, said frame being carried by a central supporting shaft to permit bunches of straw to pass radially between said blades to a point adjacent said shaft, said blades being curved laterally of themselves from one end to the other so that the shearing action takes place at one point only at any instant during rotation of the cutting blades.

CECIL B. HOBSON.